Jan. 9, 1945.   R. A. GOEPFRICH   2,367,115
BRAKE
Filed April 11, 1942

INVENTOR
RUDOLPH A. GOEPFRICH
BY
M. W. McConkey
ATTORNEY

Patented Jan. 9, 1945　　　　　　　　　　　　　　　　　　　　　　　　　　2,367,115

UNITED STATES PATENT OFFICE 2,367,115

BRAKE

Rudolph A. Goepfrich, South Bend, Ind., assignor to Bendix Aviation Corporation, South Bend, Ind., a corporation of Delaware Application April 11, 1942, Serial No. 438,532

4 Claims. (Cl. 188—152)

This invention relates to pressure regulating devices which may be used to control the pressure relationship between two or more parts of a system which utilizes fluid pressure in its operation.

My invention is illustrated as embodied in a ratio changer for a hydraulic brake system. The said ratio changer is so constituted as to cut a portion of the braking system off from the rest of the system whenever the pressure in the system reaches a pre-determined amount, and the ratio changer is further designed to do the said cutting off at various pre-determined pressures according to the setting of the ratio changer prior to operation of the hydraulic brake or fluid pressure system.

An object of my invention is to make it possible to vary the braking conditions of front and rear brakes according to conditions of the road on which the vehicle to be braked is traveling and according to the conditions of the vehicle load. In line with this object of my invention it is intended to prevent skidding of a vehicle by causing one set of brakes, the front brakes, to be subject to only a pre-determined maximum pressure regardless of the amount of pressure utilized in operating the other set of brakes. This is done to prevent locking of the front wheels and consequent loss of steering.

A second object of my invention is to provide means whereby a vehicle operator may from time to time reset the pre-determined maximum for one portion of the vehicle braking system in order to secure the desired braking ratio between front and rear vehicle brakes.

Other objects and advantages of my invention will become apparent during the course of the following description, reference being had therein to the accompanying drawing, in which.

Figure 1:
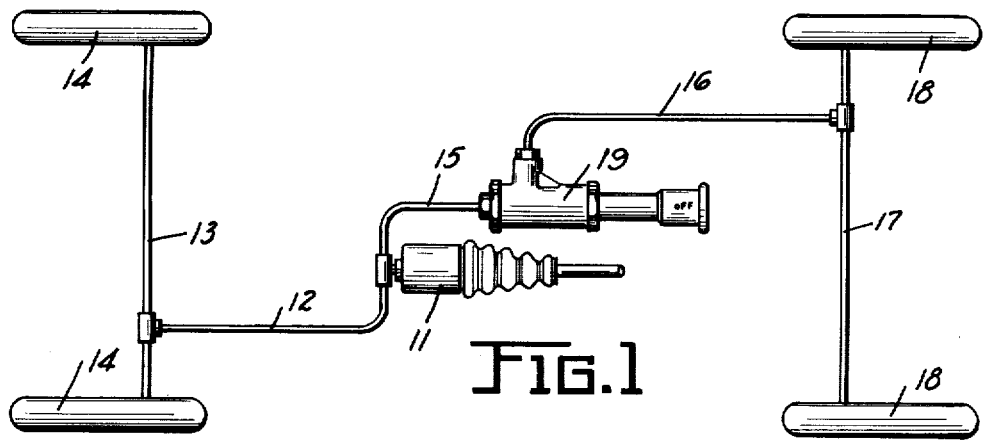
Figure 1 shows diagrammatically a braking system which incorporates my invention.

Figure 1 illustrates a hydraulic braking system of the conventional type incorporating a master cylinder or pressure producing device 11, conduits 12 and 13 connecting the master cylinder 11 to hydraulic wheel or motor cylinders (not shown) which operate brakes for vehicle rear wheels 14, conduits 15, 16, and 17 which connect the master cylinder 11 to hydraulic motor cylinders (not shown) for operating the brakes associated with the front wheels 18 of a vehicle. Connected in the hydraulic system between the conduit 15 and the conduit 16 is a ratio changing and regulating device 19.

Figure 2:
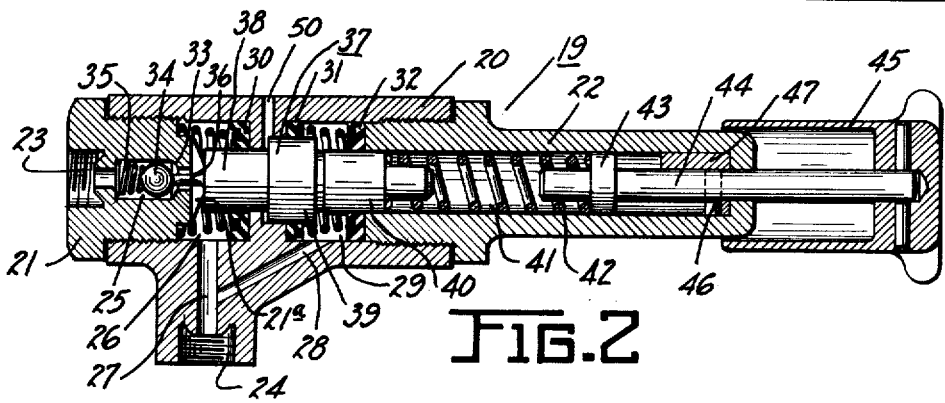
Figure 2 shows in horizontal section the interior of a ratio changing and regulating device incorporating my invention.
Figure 3:
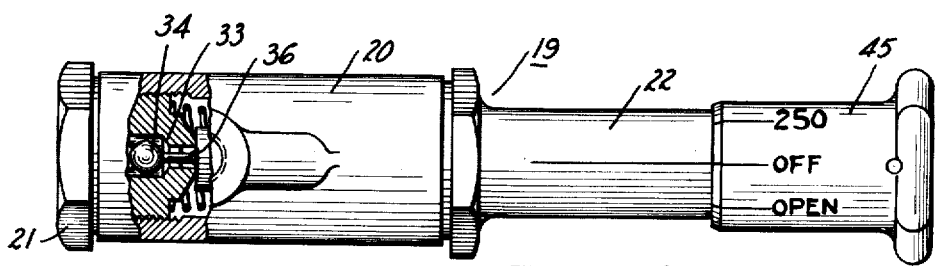
Figure 3 shows a plan view of the ratio changer of Figure 2 partially cut off to show in section the interior of the ratio changer.

The ratio changing device 19 is illustrated clearly in Figures 2 and 3. It comprises generally a main casing 20, a plug 21 screwed into one end of the casing 20, and an auxiliary casing 22 screwed into the other end of the casing 20. The particular form of the several parts which form the device 19 are not important except that they must be so designed that the interior parts of the device 19 may be assembled. An inlet port 23, through conduit 15 connects the interior of the ratio regulating device 19 with the master cylinder 11. An outlet port 24, through conduits 16 and 17 connects the interior of the ratio changing device 19 with the front wheel brakes of the vehicle.

Normally the inlet port 23 communicates with the outlet port 24 through a valve chamber 25, plunger chamber 26, and a passage 27. A groove 21a in the inner end of plug 21 allows the fluid to enter chamber 26 from chamber 25. A passage 28 leads from the passage 27 to a second plunger chamber 29, which is disconnected from the other chambers of the ratio changing device except for the passage 28.

Figure 4:
Figure 4 shows a projection of the ratio changer stop by means of which the said ratio changer may be set in various positions.

A valve seat 33 is is formed in the plug 21 between chamber 25 and chamber 26, and a valve element 34, shown in the form of a ball, is positioned in the chamber 25 and is urged toward the valve seat 33 by a spring 35. Normally urging the valve away from the valve seat 33 is a projection 36 on the end of a plunger or pressure responsive member 37. The plunger 37 is shown formed in a single piece, although it might be equally well formed from a plurality of separate pieces. One end of the plunger designated 38 extends into the chamber 26. The central portion of the plunger designated 39, larger in diameter than the other portions of the plunger, extends into the chamber 29, and a reduced portion, designated 40, of the plunger extends from the chamber 29 into a spring chamber 41 formed in the section 22 of the ratio regulating device 19. A spring 42 in the chamber 41 normally urges the plunger 37 in a direction to hold the valve 34 off its seat. At its end and away from the plunger 37, the spring 42 bears against an annular flange 43 on a rod 44, which in turn extends to the exterior of the ratio regulating device 19 where it is secured to a manually operable cap 45. Intermediate its ends the rod 44 is provided with a projection 46 which is utilized for locking the rod in different longitudinal positions according to the adjustment of the ratio regulating device. A sleeve 47 is positioned just inside the outer end of section 22 of the device 19. As shown in Figure 4 the sleeve 47 has a series of grooves in its face which are formed in an angularly inclined face 48 of the sleeve. The grooves are arranged at spaced intervals around the circumference of the sleeve in such manner that the bottom of each groove is at greater distance from the base 49 of the sleeve 47 than the next groove on one side and a lesser distance from the base 49 than the next groove on the other side. Thus are provided a series of stepped grooves in the member 47 for retaining the rod projection 46 in accordance with adjustment of the rod position. As illustrated in Figure 4 the sleeve is shown in flattened projection. In actual use it is curved to form an annular member and positioned inside the ratio regulating device as above described. The direction of inclination of the grooved face of the stop member is not important. However I have shown the direction of the inclination such that a right hand turn of the cap 45 combined with a push of the cap will move the projection 46 from groove to groove up the inclination, so that rod 44 and its flange 43 may be pushed in a direction to compress the spring 42 and thus increase the force exerted by the spring on the plunger 37.

As will of course be understood the hydraulic brake system is normally full of hydraulic liquid so that liquid is present in the conduits, in the brakes of both front and rear wheels and in the passages and chambers thus far described as being included in the ratio regulating device 19. In view of the presence of liquid in the system, sealing cups 30, 31 and 32 are provided in the right end of chamber 26, the left end of chamber 29 and the right end of chamber 29 respectively.

The manner of operation of my device will now be described. When pressure is applied to the fluid in the master cylinder, fluid is forced directly to the rear brakes and through the ratio changer 19 to the front brakes. So long as the valve 34 remains off its seat the front brakes are directly connected to the master cylinder and the unit fluid pressure at the front brakes equals the unit fluid pressure at the rear brakes. The pressure of the fluid against the left end of plunger 37 tends to push the plunger toward the right, and this pressure is opposed by the pressure of the spring 42 plus the pressure exerted by the fluid against the annular face of the portion 39 of the plunger which is exposed to the fluid in chamber 29. Incidentally, it will be noted that a passage 50 is provided in the side of the ratio changer to allow any fluid which may seep between the portion 38 and the portion 39 of the plunger to escape, thus insuring the free movement of the plunger 37 in response to various pressures effecting it; the passage 50 also prevents the pumping of air into the system. So long as the pressure spring 42 plus the pressure exerted against the annular face of portion 39 is greater than the pressure exerted by the fluid against the portion 38 of the plunger, the valve 34 will remain open and fluid will pass freely through the ratio changer. However, the area of the portion 38 which is subjected to fluid pressure is greater than the annular face of the portion 39 and, since the pressure exerted by the spring is constant, the fluid pressure acting against the portion 38 will eventually be sufficient to move the plunger to the right and allow the ball valve to seat under the influence of the spring 35, provided of course the ratio changer is not set in its completely open position to prevent the valve from closing under any pressure. Since the amount of compression of the spring 42 depends upon the setting of the projection 46 in one of the grooves in the sleeve 47 it is possible to vary the pressure exerted by the spring and to thus determine the amount of unit pressure which must exist in the fluid before the valve in the ratio changer closes, cutting the front brakes off from the master cylinder. If the ratio changer is set so that the spring 42 is under little or no compression, the front brakes will be completely cut off since only the slightest fluid pressure will be necessary to close the valve. If on the other hand, the spring 42 is compressed to a point where it is practically solid, the fluid pressure will not be able to build to such a point that it can move the plunger.

For illustrative purposes merely and with no intention of limiting my invention, I shall cite a series of illustrative figures as to the areas and pressures involved in the operation of this ratio changer. Suppose we assume the diameter of the plunger portion 39 to be $\tfrac{11}{16}$ inch, and suppose we further assume that the diameter of plunger portion 38 is $\tfrac{1}{2}$ inch. The area of the portion 38 which will be subjected to fluid pressure will be .1964 square in. The area of a cross section through the portion 39 will be .3712 square in., and subtracting .1964 square in. from this since that is the area of the reduced portion of the plunger which is just to the right of the portion 39, we have the annular area of the portion 39 which is subjected to fluid pressure and it equals .1748 square in. Now, subtracting .1748 from .1964 square in. to get the differential in area between the two portions of the plunger 37 which are subjected to fluid pressure from opposite directions, we have the differential of .0216 square in. To discover what spring load will be necessary to cut the front brakes off at a pressure of 250 pounds per square in., we multiply 250 times the differential .0216 square in., and we arrive at the figure 5.4 pounds, which is the force the spring should exert to hold the valve open until the fluid pressure reaches 250 pounds per square inch.

While I have described a single embodiment of my invention it will be appreciated that many variations might embody the same fundamental invention, and it is therefore my desire not to limit the said invention except by the terms of the appended claims. I have now completely and carefully described my improved device and

I claim:

1. A ratio changing device for a fluid system comprising a casing, a plunger movable in the casing, means for admitting fluid to the interior of the casing to simultaneously exert forces urging the plunger in opposite directions according to the areas of the plunger exposed to fluid pressure, a spring urging the plunger in one direction, a valve controlled by the position of the plunger, and means for setting the spring in various positions of compression, said means comprising a sleeve having an inclined surface provided with a plurality of grooves and said means further comprising a manually adjustable rod having a projection adapted to rest in a selected one of the grooves of the sleeve.

2. A ratio determining device for a fluid pressure system comprising a casing, a plunger movable in the casing having opposed fluid pressure responsive surfaces of different areas, a spring urging the plunger in one direction, a valve controlled by the position of the plunger, and means for setting the spring in various positions of compression, said means comprising a sleeve having an inclined surface provided with a plurality of cross grooves and said means further comprising a manually controlled member adapted to be moved from one groove to another of the sleeve to vary the setting of the spring.

3. A ratio determining device for a fluid pressure system comprising a casing, a plunger movable in the casing having opposed fluid pressure responsive surfaces of different areas, a spring urging the plunger in one direction, a valve controlled by the position of the plunger, and means for setting the spring in various positions of compression, said means comprising a sleeve having an inclined surface and said means further comprising a manually controlled member adapted to be moved to various positions along the inclined surface of the sleeve to vary the setting of the spring.

4. A hydraulic brake system comprising two sets of brakes, a ratio changing device between the two sets of brakes for cutting off one from the other when a predetermined fluid pressure has been reached, and manual means for setting the ratio changing device to cut off one set of brakes from the other at all times or cut off one set of brakes from the other at a predetermined fluid pressure or never cut off one set of brakes from the other, said means comprising a sleeve having an inclined surface provided with a plurality of grooves and said means further comprising a manually controlled member adapted to be moved from one groove to another of the sleeve to vary the setting of the spring.

RUDOLPH A. GOEPFRICH.

CERTIFICATE OF CORRECTION.

Patent No. 2,367,115.     January 9, 1945.

RUDOLPH A. GOEPFRICH.

It is hereby certified that error appears in the printed specification of the above numbered patent requiring correction as follows: Page 1, second column, line 33, strike out the word "is" second occurrence; page 2, second column, line 41, for "1748 square in." read --.1748 square in.--; and that the said Letters Patent should be read with this correction therein that the same may conform to the record of the case in the Patent Office.

Signed and sealed this 26th day of June, A. D. 1945.

Leslie Frazer (Seal)             Acting Commissioner of Patents.

projection adapted to rest in a selected one of the grooves of the sleeve.

2. A ratio determining device for a fluid pressure system comprising a casing, a plunger movable in the casing having opposed fluid pressure responsive surfaces of different areas, a spring urging the plunger in one direction, a valve controlled by the position of the plunger, and means for setting the spring in various positions of compression, said means comprising a sleeve having an inclined surface provided with a plurality of cross grooves and said means further comprising a manually controlled member adapted to be moved from one groove to another of the sleeve to vary the setting of the spring.

3. A ratio determining device for a fluid pressure system comprising a casing, a plunger movable in the casing having opposed fluid pressure responsive surfaces of different areas, a spring urging the plunger in one direction, a valve controlled by the position of the plunger, and means for setting the spring in various positions of compression, said means comprising a sleeve having an inclined surface and said means further comprising a manually controlled member adapted to be moved to various positions along the inclined surface of the sleeve to vary the setting of the spring.

4. A hydraulic brake system comprising two sets of brakes, a ratio changing device between the two sets of brakes for cutting off one from the other when a predetermined fluid pressure has been reached, and manual means for setting the ratio changing device to cut off one set of brakes from the other at all times or cut off one set of brakes from the other at a predetermined fluid pressure or never cut off one set of brakes from the other, said means comprising a sleeve having an inclined surface provided with a plurality of grooves and said means further comprising a manually controlled member adapted to be moved from one groove to another of the sleeve to vary the setting of the spring.

RUDOLPH A. GOEPFRICH.

---

CERTIFICATE OF CORRECTION.

Patent No. 2,367,115.                January 9, 1945.

RUDOLPH A. GOEPFRICH.

It is hereby certified that error appears in the printed specification of the above numbered patent requiring correction as follows: Page 1, second column, line 33, strike out the word "is" second occurrence; page 2, second column, line 41, for "1748 square in." read --.1748 square in.--; and that the said Letters Patent should be read with this correction therein that the same may conform to the record of the case in the Patent Office.

Signed and sealed this 26th day of June, A. D. 1945.

Leslie Frazer (Seal)                Acting Commissioner of Patents.